(12) United States Patent
Fahrni et al.

(10) Patent No.: US 11,975,402 B2
(45) Date of Patent: May 7, 2024

(54) BEAM MACHINING HEAD AND METHOD FOR BEAM MACHINING

(71) Applicant: BYSTRONIC LASER AG, Niederoenz (CH)

(72) Inventors: Christoph Fahrni, Oberönz (CH); Stefan Kaltenbach, Feldbrunnen (CH); Titus Haas, Zofingen (CH); Andreas Luedi, Burgdorf (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 18/249,193

(22) PCT Filed: Oct. 15, 2021

(86) PCT No.: PCT/EP2021/078615
§ 371 (c)(1),
(2) Date: Apr. 14, 2023

(87) PCT Pub. No.: WO2022/079239
PCT Pub. Date: Apr. 21, 2022

(65) Prior Publication Data
US 2023/0286078 A1    Sep. 14, 2023

(30) Foreign Application Priority Data

Oct. 16, 2020    (EP) .................................... 20202234

(51) Int. Cl.
*B23K 26/042*    (2014.01)
*B23K 10/00*    (2006.01)

(52) U.S. Cl.
CPC .......... *B23K 26/042* (2015.10); *B23K 10/006* (2013.01)

(58) Field of Classification Search
CPC ............................. B23K 26/042; B23K 10/006
(Continued)

(56) References Cited

U.S. PATENT DOCUMENTS

2017/0122728 A1*  5/2017  Kipfer ................ G02B 27/0961
2020/0055142 A1*  2/2020  Schürmann ........ B23K 26/1462

FOREIGN PATENT DOCUMENTS

EP    2894004    *  7/2015
EP    2673108 B1    3/2017
(Continued)

OTHER PUBLICATIONS

International Search Report and Written Opinion, dated Jan. 27, 2022, from PCT/EP2021/078615.
(Continued)

*Primary Examiner* — Dana Ross
*Assistant Examiner* — Joseph W Iskra
(74) *Attorney, Agent, or Firm* — Workman Nydegger

(57) ABSTRACT

A beam machining head (10; 100; 200) for beam cutting of a workpiece is provided, having an interface (12) for an energy beam source (14; 14, 201) for generating a focused machining energy beam (15; 206) selected from a particle beam source, a fuel fluid beam source, a plasma beam source and/or a source for electromagnetic radiation; an exit opening (16) for the machining energy beam bounded by an opening edge (18); an optical detector unit (19) for recording at least one image of an electromagnetic radiation (17) emitted from the workpiece (11) through the exit opening into the beam machining head (10; 100; 200) and induced in the workpiece by the machining energy beam; and a monitoring unit (30) connected in a data-transmitting manner to the optical detector unit for monitoring a positional relationship between a centre of the emitted electromagnetic radiation and the exit opening, wherein the monitoring unit (30) has: a first determination module for determining at least one position (180; 182) of the exit opening in the at least one image; a second determination module for determining at least one position (170) of the centre of the emitted elec-
(Continued)

tromagnetic radiation in the at least one image; and a third determination module for determining the positional relationship between the at least one position (170) of the centre of the emitted electromagnetic radiation and the at least one position (180; 182) of the exit opening (16). A beam machining device and a method for beam cutting are further disclosed.

15 Claims, 13 Drawing Sheets

(58) Field of Classification Search
USPC .................................................... 219/121.6
See application file for complete search history.

(56) References Cited

FOREIGN PATENT DOCUMENTS

| EP | 2894004 B1 | | 10/2017 |
|----|------------|---|---------|
| JP | 2003225787 A | | 8/2003 |
| JP | 2019171431 | * | 10/2019 |
| JP | 2019171431 A | | 10/2019 |

OTHER PUBLICATIONS

International Preliminary Report on Patentability, dated Feb. 20, 2023 from PCT/EP2021/078615.

* cited by examiner

BEAM MACHINING HEAD AND METHOD FOR BEAM MACHINING

FIELD OF THE INVENTION

The invention relates to a beam machining head, a beam machining device, a use thereof, and a method, each for beam cutting a workpiece.

BACKGROUND

There are beam machining systems, for example plasma cutting systems, laser cutting systems and machining systems with particle beamers, in which a machining energy beam is used as an energy inducing beam (hereinafter also referred to as energy inducer) for machining a workpiece. Energy, such as electromagnetic radiation and/or a thermal reaction, is induced in the workpiece. Typically, it is desirable to know or align the position of the energy inducing beam within the exit opening of the machining device. In a laser cutting machine, the machining laser beam is used as the energy inducer, and the exit opening is the nozzle opening of a cutting gas nozzle. In plasma cutting systems, the energy inducer is the plasma stream and the exit opening is also the gas nozzle opening. In particle emitters (ion emitters, electron emitters), a particle stream serves as the energy inducer and the associated exit opening is an acceleration electrode. In the following, laser and plasma cutting systems are discussed in particular with reference to the position of the energy-inducing beam within the nozzle-shaped exit opening, also called nozzle or gas nozzle. The same applies to the energy-inducing beam and the exit opening of the machining equipment with particle emitters.

In cutting systems using gases, the relative position of the energy inducer to the exit opening (nozzle) is relevant since, in addition to the energy inducer, a gas jet is also required for material machining and this is formed by the gas nozzle. If these are unfavourably aligned relative to each other, material machining, cutting quality and/or cutting speed will be impaired. If, for example, in the case of a laser cutting system, the gas jet and the energy inducer are arranged to be coaxial with each other, the gas jet can optimally blow out the material melted by the energy inducer from the kerf when inert cutting gas (such as $N_2$) is used. It should be noted that the gas jet can also be the energy inducer at the same time. In the case of reactive cutting gas (such as $O_2$), the gas is optimally brought to the point of ignition by the energy inducer for the purpose of oxidation. In addition, a coaxial guidance of the two beams or the one beam (energy inducer and gas jet) is also desirable for a direction-independent process. If the two beams are well superimposed, the cutting system will cut equally well in all cutting directions. There are also machining processes in which a (usually parallel) offset of the two beams is desired. It is convenient to know and be able to adjust the offset of the energy inducer beam and the gas jet.

In plasma cutting systems with a plasma beam as energy inducer, the position or direction of the plasma beam can be determined by the position and orientation of a plasma nozzle electrode of the exit opening. In laser cutting systems with a laser beam as energy inducer, the position or direction of the laser beam is determined by the various optical elements such as the fibre exit, deflecting mirror, and lenses. The position or direction of a gas jet is essentially determined by the position and orientation of the nozzle. If the laser beam is to be aligned coaxially with the gas jet, it is desirable to direct the energy inducer as centrally as possible, i.e., through the centre of the exit or nozzle opening. In the field of laser cutting systems, various systems are known to check the nozzle entering, i.e., the centring of the laser beam in the nozzle, before or after cutting. This can be done "offline" by means of docking stations, i.e., with stations provided outside the machining area of the cutting system, such as disclosed in EP1967316B1, JP2018015808A or US2018328725A. Here, the working laser beam or an auxiliary laser beam is observed to determine the centre of the laser beam. Another offline approach is described in JP2003225787A, where a hole is shot in a sheet metal to determine the position of the working laser.

During the workpiece machining process, it is typically almost impossible to continuously check the centring of the exit opening/nozzle and the energy inducer (also referred to as nozzle centring). Thus, displacements of the nozzle that occur during a cutting process due to, e.g., minor contact as well as collisions with upright workpiece parts are not noticed. Therefore, it may happen that cutting is performed with a de-adjusted nozzle position and an insufficient cutting quality is produced.

A well-known approach for checking nozzle centring is described in EP2673108B1 (or DE102011003717). For this purpose, a coaxial camera is used, which is aligned with the workpiece along the machining laser beam through the nozzle. During cutting, the centre of the kerf is determined via camera images and this is compared with the centre of the nozzle, which is also determined using a coaxial camera. This procedure is based on the assumption that the centre of the laser beam coincides with the centre of the kerf. If the cut was made in at least two different directions (preferably perpendicular to one another), the centre of the laser beam can be determined in the plane perpendicular to the laser beam propagation and compared with the centre of the nozzle opening. If, for example, the nozzle opening touches an already cut upright workpiece part during a straight cut and the nozzle is thereby slightly de-adjusted in the cutting direction, insufficient cutting quality is the immediate result. However, the de-adjustment of the nozzle may only be noticed when the cutting direction is changed.

Furthermore, EP2894004B1 proposes to observe the laser beam reflected from the workpiece during machining for laser beam localization using a coaxial camera. However, the laser beam is typically not visible during a cutting operation. Furthermore, laser beam localization by means of the laser beam reflected at the workpiece only works without errors if the laser beam is reflected there perfectly perpendicularly. This means that the workpiece must be oriented exactly perpendicular to the laser beam. JP2019171431A discloses a laser processing device having a laser oscillator that oscillates laser light; a light-condensing lens being a light-condensing optical system that condenses laser light; a nozzle having an opening part through which laser light passing through the light-condensing optical system is emitted toward a work-piece. The laser processing device further comprising a camera being a photographing part that photographs the opening part and irradiation regions of the laser light in the work-piece; a beam splitter being an optical branching element that reflects first incident light made incident thereto from the laser oscillator toward the work-piece, and makes second incident light made incident thereto from the work-piece to transmit there through to make the light incident to the photographing part, and a lens driving part being an adjustment part that makes an adjustment to correct a deviation between a centre of the opening part and a centre of the laser light on the basis of image data obtained by photographing the opening part and the irradiation regions.

The object of the invention is to provide a beam machining head, in particular an energy beam machining head, and a method of beam cutting, in particular energy beam cutting, which permit meaningful monitoring of the relative positions of the machining energy beam and the exit aperture with respect to one another.

This object is achieved with a beam machining head according to claim 1, a beam machining device according to claim 7, a use according to claim 8, a method for beam cutting a workpiece according to claim 9, as well as a computer program product according to claim 15, and a computer readable medium according to claim 16.

A first embodiment of the invention relates to a beam machining head for beam cutting, in particular energy beam cutting, of a workpiece, having an interface for an energy beam source for generating a focused machining energy beam selected from a particle beam source, a fuel fluid beam source, a plasma beam source and/or a source for electromagnetic radiation; having an exit opening for the machining energy beam bounded by an opening edge; an optical detector unit for recording at least one image of an electromagnetic radiation emitted from said workpiece through said exit opening into said beam machining head, which is induced in said workpiece by said machining energy beam and is a process light; and a monitoring unit connected to said optical detector unit in a data-transmitting manner for monitoring a positional relationship between a centre of said emitted electromagnetic radiation and said exit opening, said monitoring unit comprising a first determination module for determining at least one position of the exit opening in the at least one image; a second determination module for determining at least one position of the centre of the emitted electromagnetic radiation in the at least one image; and a third determination module for determining the positional relationship between the at least one position of the centre of the emitted electromagnetic radiation and the at least one position of the exit opening. The second determination module is configured to determine a position of a centre of highest energy density of the emitted radiation as the position of the centre of the emitted electromagnetic radiation.

To monitor the relative position of the machining energy beam and the exit opening with respect to one another, the beam machining head of the embodiments observes not the machining energy beam but the centre of the emitted electromagnetic radiation from the workpiece through the exit opening into the beam machining head induced by the machining energy beam in the workpiece, also called process light or intrinsic illumination of the workpiece. Thus, for observing the position of the machining energy beam, radiation generated by the interaction of the machining energy beam with the material of the workpiece is used, and not radiation reflected from a workpiece. In other words, the energetically relevant centre of the machining energy beam is indirectly observed. Monitoring is thus carried out while observing the effect of the machining energy beam. If the monitoring results are used to readjust the relative position of the machining energy beam and the exit opening with or without the desired offset, also known as centring of the machining energy beam and/or the exit opening, this is done by means of so-called effective centring. It has been shown that this enables more accurate centring and a much more precise cut than with the known centring of the beam axis to the exit opening or to the nozzle opening. The beam machining head also allows monitoring of the relative position of the machining energy beam and the exit opening to one another not only in one direction, but in more than one direction, independent of the cutting direction. Furthermore, the positional relationship can be monitored continuously or discontinuously and/or during beam cutting, in particular in real time. Monitoring and/or any necessary readjustment of the relative position of the machining energy beam and the exit opening to one another is performed on the basis of the respective positions of the emitted electromagnetic radiation and the exit opening in the recorded image. Monitoring and/or readjustment of the relative position of the machining energy beam and the exit opening with respect to one another can therefore be performed substantially independently of the shape, vibration, or dispersion of the machining energy beam.

The detector device may be provided at a second interface of the beam machining head. At least some of the units of the beam machining head can be connected to a computer-based control unit of the beam machining head in a wired or wireless data-transmitting manner. The monitoring unit can also be part of the control unit. The third determination module can be or have a comparator module which compares the positions determined. The first, second, and third determination modules may be computer program modules and/or implemented in any combination in a computer program.

In the beam machining head, the monitoring unit may have a control module for outputting at least one element selected from a signal indicating the determined positional relationship, in particular to a display unit; a signal indicating a determined positional relationship deviating from a predetermined positional relationship; a control command, in particular to a control unit, selected from a command to continue machining and a command to stop machining; and at least one positioning command, in particular to a positioning unit, for setting the positional relationship between the at least one position of the centre of the emitted electromagnetic radiation and the at least one position of the exit opening to a predetermined positional relationship. The predetermined positional relationship can be specified as constant or as variable, e.g., depending on a machining specification, even during a machining operation. The predetermined positional relationship may take into account a desired, constant or variable, parallel or non-parallel relative offset of the machining energy beam and the exit opening from one another. Alternatively, a desired relative offset of the machining energy beam and the exit opening can be taken into account by the first or second determination module after determining the respective positions, e.g., added to the respective position, or by the third determination module in the comparison. With the aforementioned measures, monitoring and/or readjustment of the relative position of the machining energy beam and the exit opening to one another can be realized in different ways. This also allows an offset of the machining energy beam and a cutting gas jet passed through the exit opening to be monitored and/or adjusted.

Further, the control module may be configured to output a calibration command for calibrating the imaging scale of the at least one image. The imaging scale is generally understood as the ratio between the optical size of an image of an object, e.g., in this case, the size of the exit opening in the recorded image, and the actual size of the object, e.g., in this case, the size of the exit opening.

In the beam machining head, the first determination module may be configured to determine the at least one position of the exit opening in at least two directions.

Alternatively or additionally, the first determination module may be configured to determine at least one element selected from the at least one position of the opening edge defining the exit opening and the position of a centre of the exit opening.

Furthermore, the second determination module may be configured in the beam machining head for determining the at least one position of the centre of the emitted electromagnetic radiation in at least two directions, in particular in the transverse direction and longitudinal direction with respect to the cutting direction. The second determination module may be further configured to determine the position of the centre of the emitted radiation in the longitudinal direction with respect to the cutting direction by estimating and/or including an error tolerance of 3 to 10%, preferably 4 to 6%, and/or by using the first-moment method. This is true, in particular, in the case of a recorded image that displays the emitted radiation elongated in the cutting direction, e.g., due to the speed of the cutting process and/or an afterglow in the workpiece and/or a low camera image frequency of the detector unit. The second determination module may be further configured to determine a position of a spatial centre of the emitted radiation as the position of the centre of the emitted electromagnetic radiation. To determine the position of the spatial centre of the emitted radiation, for example, the number of pixels of a digital image recorded with the detector unit can be used as a unit. To determine the position of a centre of highest energy density, for example, the brightest pixel or a group of contiguous pixels with the greatest, in particular averaged, brightness of a digital image recorded with the detector unit can be used.

The beam machining head may be provided with: an energy beam source provided at the interface for generating a focused machining energy beam; and/or a positioning unit, in particular connected to the monitoring unit in a data-transmitting manner, for continuously or discontinuously adjusting the positional relationship between the at least one position of the centre of the emitted electromagnetic radiation and the at least one position of the exit opening, in particular to a predetermined positional relationship; and/or an illumination unit for continuously, discontinuously, intermittently and/or stroboscopically illuminating the workpiece through the exit opening or an interface for such an illumination unit. In embodiments in which the monitoring unit is connected to the positioning unit in a data-transmitting manner, an additional docking station for readjusting the relative position of the machining energy beam and the exit opening with respect to one another is not required.

In the beam machining head, the exit opening and the optical detector unit may be arranged coaxially, in particular coaxially with respect to a propagation direction of the machining energy beam through the exit opening. Furthermore, the optical detector unit may be configured to record at least one image of at least a portion of an emitted electromagnetic radiation from the workpiece coaxially through the exit opening into the beam machining head, in particular coaxially with respect to the propagation direction of the machining energy beam through the exit opening. Alternatively or additionally, the exit opening may be configured to be circular and/or with a diameter of 0.025 to 10 mm, preferably 0.6 to 8 mm, more preferably 0.8 to 6 mm. Furthermore, the third determination module and/or the control module may be configured to correct at least one perspective of the at least one image and/or different perspectives of the at least one position of the exit opening and the at least one position of the centre of the emitted electromagnetic radiation.

A further embodiment relates to a beam machining device for beam cutting of a workpiece, in particular for laser machining or plasma beam machining, with a beam machining head according to the above embodiments or modifications thereof.

In another embodiment, a use of a beam machining head according to the foregoing embodiments or variations thereof or a beam machining device according to the foregoing embodiment for beam cutting, in particular for laser machining or plasma beam machining, of a workpiece is disclosed.

An additional embodiment relates to a method for beam cutting of a workpiece, in particular for laser beam machining or plasma beam machining, using a beam machining head according to the above embodiments or modifications thereof, or a beam machining device according to the above embodiment, having the following steps: Generating a machining energy beam with an energy beam source provided at the interface of the beam machining head for generating a focused machining energy beam selected from a particle beam source, a fuel fluid beam source, a plasma beam source and/or a source for electromagnetic radiation; irradiating a workpiece with the machining energy beam through the exit opening; machining the workpiece with the machining energy beam, inducing electromagnetic radiation in the workpiece which is a process light (17) and is emitted at least partially coaxially with the machining energy beam through the exit opening into the beam machining head; recording at least one image of at least part of the emitted electromagnetic radiation induced in the workpiece by the machining energy beam through the exit opening into the beam machining head with the optical detector unit of the beam machining head; and monitoring a positional relationship between a centre of the emitted electromagnetic radiation and the exit opening with the monitoring unit of the beam machining head, wherein the first determination module of the monitoring unit determines at least one position of the exit opening in the at least one image, the second determination module of the monitoring unit determines at least one position of the centre of the emitted electromagnetic radiation in the at least one image, and the third determination module of the monitoring unit determines the positional relationship between the at least one position of the centre of the emitted electromagnetic radiation and the at least one position of the exit opening. The second determination module determines the position of a centre of the highest energy density of the emitted radiation as the position of the centre of the emitted electromagnetic radiation.

In the method, the control module of the monitoring unit may output at least one element selected from a signal indicating the determined positional relationship, in particular to a display unit; a signal indicating a determined positional relationship deviating from a predetermined positional relationship; a control command, in particular to a control unit, selected from a command to continue machining and a command to stop machining; and at least one positioning command, in particular to the positioning unit, for setting the positional relationship between the at least one position of the centre of the emitted electromagnetic radiation and the at least one position of the exit opening to a predetermined positional relationship. Further, the control module may output a calibration command for calibrating the imaging scale of the at least one image.

In the method, the first determination module may determine the at least one position of the exit opening in at least two directions. Alternatively or additionally, the first determination module may determine at least one element selected from the at least one position of the opening edge bounding the exit opening and the position of a centre of the exit opening.

In the method, the second determination module may determine the at least one position of the centre of the emitted electromagnetic radiation in at least two directions. Alternatively or additionally, the second determination module may determine the position of a spatial centre of the emitted radiation as the position of the centre of the emitted electromagnetic radiation.

The method may further involve: continuously or discontinuously adjusting the positional relationship between the at least one position of the centre of the emitted electromagnetic radiation and the at least one position of the exit opening, in particular to a predetermined positional relationship, in particular by means of the positioning unit; and/or calibrating the imaging scale of the at least one image; and/or correcting at least one perspective of the at least one image and/or different perspectives of the at least one position of the exit opening and the at least one position of the centre of the emitted electromagnetic radiation, in particular by means of the third determination module and/or the control module.

In the method, the optical detector unit may record at least one image of at least a portion of an emitted electromagnetic radiation from the workpiece coaxially through the exit opening into the beam machining head, in particular coaxially with respect to the propagation direction of the machining energy beam through the exit opening.

Furthermore the workpiece can be illuminated through the exit opening coaxially or non-coaxially to the machining energy beam continuously, discontinuously and/or stroboscopically, in particular with the illumination unit. In the method, two or more images can further be recorded in an alternating manner, in particular periodically alternating, with illumination and without illumination.

Another embodiment relates to a computer program product, containing one or more program modules that cause the beam machining head according to the preceding embodiments or variations thereof or the beam machining device according to the preceding embodiment to perform method steps according to the preceding embodiments or variations thereof, in particular when the program modules are loaded into a memory of the monitoring unit, in particular comprising at least one element selected from the first determination module, the second determination module, the third determination module, the control module and a combination thereof. That is, a computer program product or computer program for carrying out the method according to the foregoing embodiments or variations thereof is provided.

A further embodiment discloses a computer readable medium on which are stored one or more program modules, which are readable and executable by the monitoring unit of the beam machining head according to the preceding embodiments or variations thereof or the beam machining device according to the preceding embodiment, in order to execute method steps according to the above embodiments or variations thereof, in particular when the program modules are loaded into a memory of the monitoring unit, in particular at least one element selected from the first determination module, the second determination module, the third determination module, the control module and a combination thereof. That is, a computer readable medium may be provided on which the computer program product of the foregoing embodiment is stored.

The beam machining devices, computer program product, and computer readable medium of the foregoing embodiments can be used to realize the same benefits and functions as embodiments and variations of the beam machining head, particularly having identical and/or analogous features.

Further features and efficiencies arise from the following description of exemplary embodiments, the figures and the dependent claims. The above-mentioned features and those described below can be used without departing from the scope of the present invention not only in the respective combinations indicated, but also in other combinations or in isolation.

BRIEF DESCRIPTION OF THE DRAWINGS

The invention is explained in more detail below on the basis of exemplary embodiments with reference to the accompanying drawings, which likewise disclose features that are essential to the invention. These exemplary embodiments are used for illustration purposes only and are not to be construed as limiting. For example, a description of an exemplary embodiment with a large number of elements or components should not be interpreted to the effect that all of these elements or components are necessary for implementation. Rather, other exemplary embodiments can also contain alternative elements and components, fewer elements or components, or additional elements or components. Elements or components of different exemplary embodiments can be combined with one another, unless otherwise stated. Modifications and variations which are described for one of the exemplary embodiments can also be applied to other exemplary embodiments. To avoid repetition, elements that are the same or that correspond to one another are denoted by the same reference symbols in different figures and are not explained more than once. In the figures:

FIG. 2b shows an image recorded by a camera corresponding to FIG. 2a.

FIG. 3b shows an image recorded by a camera corresponding to FIG. 3a;

FIG. 5b shows an image recorded by a camera corresponding to FIG. 5a;

FIG. 6b shows an image recorded by a camera corresponding to FIG. 6a;

FIG. 7b shows images recorded by a camera corresponding to FIG. 7a; and

DETAILED DESCRIPTION OF SOME EXAMPLE EMBODIMENTS

Figure 1:
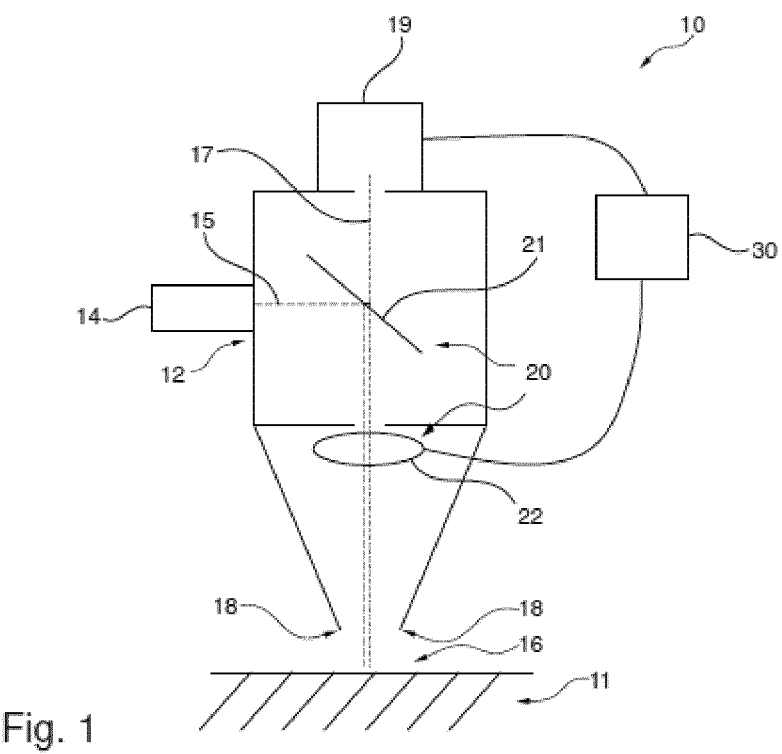
FIG. 1 schematically shows a laser cutting head 10.

The following exemplary embodiments are described with reference to laser cutting heads and a plasma cutting head, however, the invention is not limited thereto. The terms "position of the centre of the emitted electromagnetic radiation," "position of the exit opening," "position of the opening edge," "position of the centre of the exit opening," and variations thereof, refer to the respective position in the at least one image recorded by the detector unit, and may also be referred to as the image position. In the following, the terms "centring of the machining energy beam" and "centring of the exit opening" and variations thereof refer to an adjustment of the relative position of the machining energy beam and the exit opening in relation to one another with or without a desired offset. Furthermore, the term "emitted electromagnetic radiation" and variations thereof are synonymously referred to as "emitted radiation" with corresponding variations. In the following, in the case of described value ranges, it is understood that the specification of a broad range with narrower alternative or preferred ranges also discloses ranges that can be formed by any arbitrary combination of specified lower range limits and specified upper range limits.

FIG. 1a shows a beam machining head in the form of a laser cutting head 10 for machining of a workpiece 11 by laser cutting. The laser cutting head 10 has: an interface 12, at which in this example a machining laser source 14 is provided for emitting a machining laser beam 15 as a focused machining energy beam; an exit opening 16 for the machining laser beam 15, which has an opening edge 18; an optical detector unit 19 for detecting a process light beam 17, also called process light 17, emitted by the workpiece 11 as emitted electromagnetic radiation; a dichroic deflecting mirror 21 which reflects the machining laser beam 15 and deflects it in the direction of the exit opening 16 and which is at least partially transparent for the process light beam 17; and a lens 22, in this case a focusing lens, between the deflecting mirror 21 and the exit opening 22.

The machining laser source 14 in the present example has a power of approximately 12 kW and generates the machining laser beam 15 having a central wavelength of 1070 nm. However, other power outputs and/or spectral ranges suitable for laser machining, in particular laser cutting, can also be selected, e.g., in a range from 300 W to 25 kW and 200 to 1100 nm.

The opening edge 18 of the exit opening 16 is circular in the present example and has a diameter of 4 mm.

The optical detector unit 19 is used to record at least one image of the process light beam 17 emitted from the workpiece 11 through the exit opening 16 into the laser cutting head 10. In the present example, a monochromatic CMOS video camera equipped with a filter is used, which is sensitive to a wavelength range of the process light beam 17, e.g., from 400 to 1000 nm. The optical detector unit 19 and the machining laser source 14 can also be arranged interchangeably on the laser cutting head 10. In this case, the deflecting mirror 21 is configured to be at least partially transparent for the machining laser beam 15 and reflective for the process light. In further examples, other radiation-sensitive detectors such as photodiodes or a CCD camera may be provided. The optical detector unit 19 can generate individual images and/or a sequence of images, the latter in particular as a video stream. Hereinafter, the detector unit 19 will also be referred to as a camera or video camera, and the individual or sequential images produced thereby will also be referred to as recordings or video recordings or video stream.

In the present example, the focusing lens 22 is configured to pivot relative to its central axis by means of a controllable, mount equipped with a drive (not shown) to adjust the direction of propagation of the machining laser beam 15 through the exit opening 16 toward the workpiece 11. Instead of the focusing lens 22, a corresponding pivoting collimating lens may be provided. Optionally, other optical elements may be provided for guiding and shaping the machining laser beam 15. In other examples, the deflecting mirror 21 is configured to pivot by means of a controllable mount equipped with a drive to adjust the direction of propagation of the machining laser beam 15 through the exit opening 16 toward the workpiece 11. In this way, a positioning unit 20 can be implemented for continuously or discontinuously adjusting the positional relationship between the at least one position of the centre of the process light 17 and the at least one position of the exit opening 16 in the recorded image, in particular to a predetermined positional relationship. As an alternative or in addition to adjusting the position of the machining laser beam by means of adjusting the beam guiding components, i.e., the deflecting mirror 21 or the focusing lens 22, the position of the exit opening 16 can be changed, whereby a controllable automatic exit opening shifting system with a drive can be provided. (not shown in the figures).

Furthermore, a monitoring unit 30 is provided, which is connected to the detector unit 19 (wired or wireless) in a data-transmitting manner. The monitoring unit 30, as shown in FIG. 1, may also be connected in a data-transmitting manner (wired or wireless) to the mounting of the focusing lens 22 to allow adjustment of the direction of propagation of the machining laser beam 15 through the exit opening 16 and/or a desired offset thereof from each other in the direction of the workpiece 11. In examples with a pivoting deflecting mirror 21, the monitoring unit 30 can alternatively or additionally be connected to the drive of the mounting of the deflecting mirror 21 in a data-transmitting manner. In examples with a movable exit opening 16, the monitoring unit 30 can alternatively or additionally be connected to the drive of the automatic exit opening shifting system in a data-transmitting manner.

The monitoring unit 30 has a first determination module for determining at least one position of the exit opening 16 in the at least one image, a second determination module for determining at least one position of the centre of the process light beam 17 in the at least one image, and a third determination module for determining the positional relationship between the at least one position of the centre of the process light beam 17 and the at least one position of the exit opening 16. In the present example, the monitoring unit 30 is part of a computer-based central control unit of the laser cutting head 10. The first, second, and third determination modules are computer program modules in the present case that can be executed by the laser cutting head 10 after being loaded into a memory of the monitoring unit 30. In the present example, the third determination module is a comparator module that compares the positions of the centre of the exit opening 16 and the centre of the process light beam 17 determined in the recorded image.

During operation of the laser cutting head 10, the machining laser beam 15 is generated and imaged on the workpiece 11 by the dichroic mirror 21 and the focusing lens 22. The workpiece 11 is machined with the machining laser beam 15, wherein the machining laser beam 15 is guided over the workpiece. This creates a cut with a kerf in the workpiece 11. The radiation produced during laser cutting by the self-emission of the workpiece 11, i.e., the self-illumination of the workpiece, enters the laser cutting head 10 as the process light 17 at least partially through the exit opening 16. There it passes through the focusing lens 22 and the dichroic mirror 21, both of which are at least partially transparent to the process light beam 17. This finally enters the detector unit 19 and is recorded there by the video camera. The video recordings obtained in this way are fed to the monitoring unit 30, are stored there and analysed with the determination modules. The video recordings can be played back on a monitor (not shown) at the moment of laser machining, i.e. live, as individual recordings and/or as a video stream.

Figure 2A:
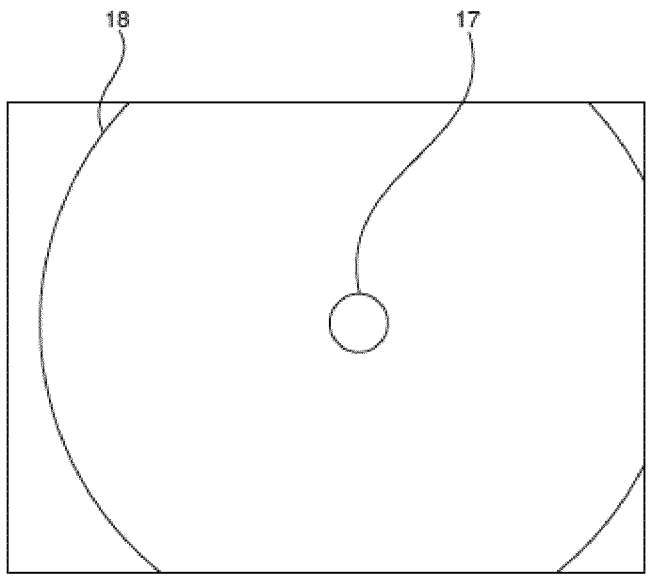
FIG. 2a schematically shows an image of a process zone of a workpiece through the exit opening of the laser cutting head 10 with the exit opening and with the emitted electromagnetic radiation into the laser cutting head through the exit opening.
Figure 2B:
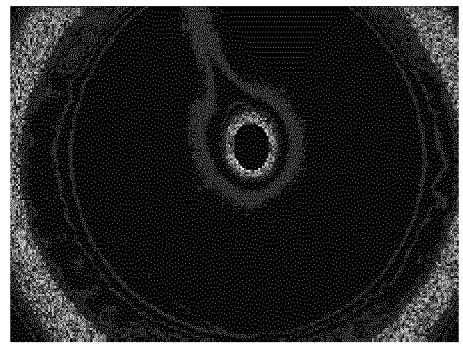

FIG. 2a schematically shows a recording, i.e., a recorded image, of the process zone of the workpiece 11 through the exit opening 16, showing the opening edge 18 of the exit opening 16 and the process light beam 17 emitted through the exit opening into the laser cutting head 10. FIG. 2b shows the camera recording on which FIG. 2a is based. Since, in the present example, the opening edge 18 is formed from brass or copper and has a reflective surface, not only the process light 17 induced in the workpiece 11 by the machining laser beam 15 and emitted from the workpiece, but also the process light 17 reflected at the opening edge 18 into the laser cutting head is recorded with the video camera.

From the image of FIG. 2b, the first determination module determines the position of at least three pixels of the imaged inner opening edge 18 and, from this, the position of the spatial centre of the exit opening 16 in the image. In the present case, the second determination module determines the position of the spatially central pixel of the imaged process light 17, e.g., its position in two mutually perpendicular directions, and from this the spatial position of the centre of the process light in the image. Both positions are compared by the third determination module, which determines a position relationship therefrom.

Figure 3A:
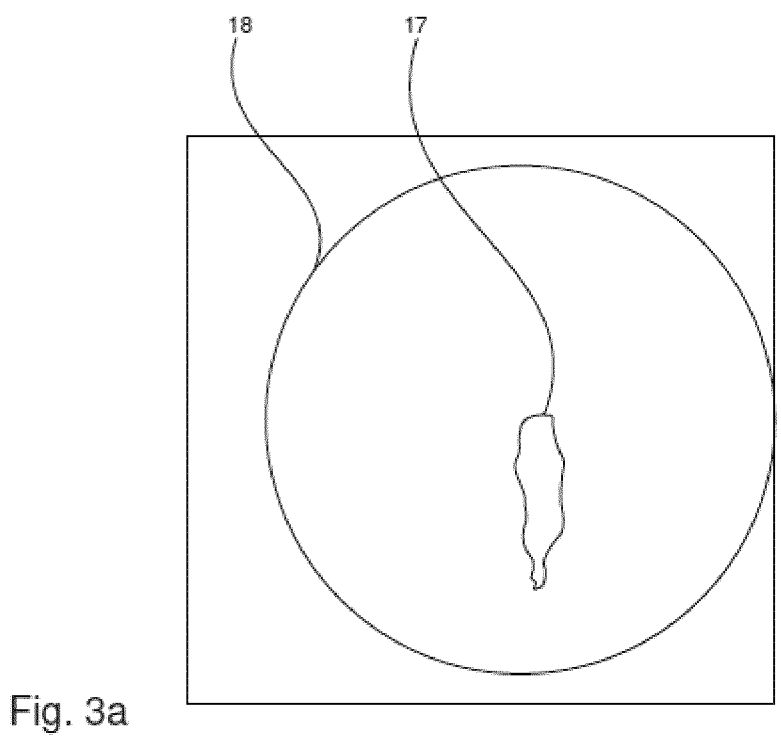
FIG. 3a schematically shows an image of a process zone of a workpiece through the exit opening of the laser cutting head 10 with the exit opening and with the emitted electromagnetic radiation into the laser cutting head through the exit opening.
Figure 3B:
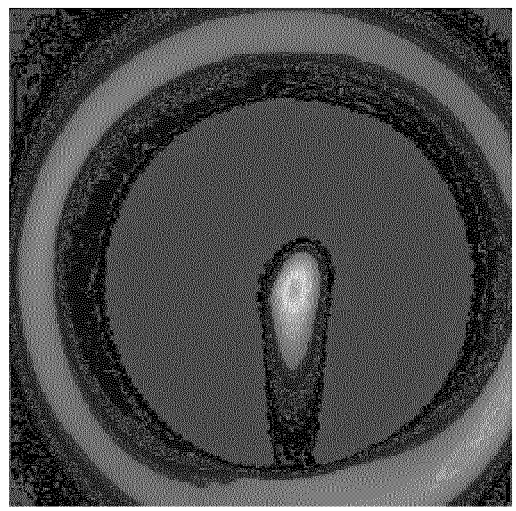

If the process light 17 in the camera image, as shown in FIGS. 3a, 3b, is imaged drawn along its length in the cutting direction, e.g., due to the speed of the cutting process and/or because of an afterglow in the workpiece, an estimate is made to determine the central spatial position of the process light 17 in the longitudinal direction of the imaged process light 17. For example, in this case a higher error tolerance, about 10%, is considered in the longitudinal direction compared to about 1 to 5% in the transverse direction. In the present example, this estimation is carried out by the second or third determination module.

In the present example, the determined positional relationship is displayed on the monitor. Alternatively or additionally, if there is an undesired deviation between the two positions, a warning signal can be emitted, e.g. acoustically, and the deviation be indicated in this manner.

In alternative examples, the foregoing actions to indicate the determined positional relationship are caused by a control module that is also implemented as a computer program module in the monitoring unit 30 of the laser cutting head 10. The control module can further output: a control command, in particular to the central control unit, selected from a command to continue machining and a command to stop machining.

Other examples are based on a one-time (before or at the beginning of machining) or repeated (in the course of machining) calibration of the imaging scale of one or more acquired images while storing the associated recording conditions, for example in the images of FIGS. 2a, 2b. The imaging scale of the image is determined from the known diameter of the opening edge 18 of the exit opening 16 and the number of pixels of the diameter of the exit opening 16 imaged in the camera image. Thus, from the number of pixels of dimensions of recorded objects or of distances of recorded objects, the actual spatial dimensions or distances of the respective objects, i.e., in this case of the process light beam 17 and the exit opening 16, in the cutting head 10 can be concluded.

Based on such a calibration, the control module can issue at least one positioning command, in particular to the positioning unit 20, in this case to the controllable holders of the deflecting mirror 21 and/or the focusing lens 22. As a result, the positional relationship between the at least one position of the centre of the process light beam 17 and the at least one position of the exit opening 16 is set to a predetermined positional relationship, e.g., in the ongoing video stream. This can be done discontinuously before a machining operation, at the beginning of a machining operation or with interruption of the machining operation and/or discontinuously or continuously during a machining operation of beam cutting. Setting to the predetermined positional relationship outside of the machining operation, i.e. offline, provides the advantages that the laser cutting head 10 and the detector unit 19 are not in motion, which can prevent the process light 17 from being displayed in an elongated way, and that recordings can be made with a low camera image frequency.

The predetermined positional relationship can be specified as constant or as variable, e.g., depending on a machining specification. The predetermined positional relationship may take into account a desired, constant or variable, parallel or non-parallel offset of the machining laser beam 15 and the exit opening 16 from one another.

Alternatively or additionally, a positioning command can be issued to a manipulator which moves the cutting head 10 within a machining machine, and the manipulator clamps the housing of the cutting head 10 in the vicinity of the exit opening 16 on the machining machine before the machining operation or after interruption of the machining operation and moves the cutting head 10 in suitable directions until, for example in the ongoing video stream, the desired positional relationship between the imaged exit opening 16 and the imaged centre of the process light 17 is achieved. Alternatively, in a calibrated system, if it is known by how much the actual exit opening 16 must be moved, the cutting head 10 can be moved by that amount without having to monitor an ongoing video stream.

If it is known that only the exit opening 16 or only the centre of the process light 17 is typically shifted from the ideal position by a collision, part contact, etc. of the laser cutting head 10, the adjustment to the predetermined positional relationship can be simplified by correcting only the relevant shifted position. If, for example, it is known that only the position of the exit opening 16 can be moved and the position of the process light 17 always remains unchanged, then only the position of the exit opening can also be newly determined. The newly determined position of exit opening 16 can then either be compared to its known position and/or readjusted if necessary. Alternatively, the newly determined position of exit opening 16 can also be compared with the known position or position determined offline of the process light 17 and corrected if necessary.

Figure 4:
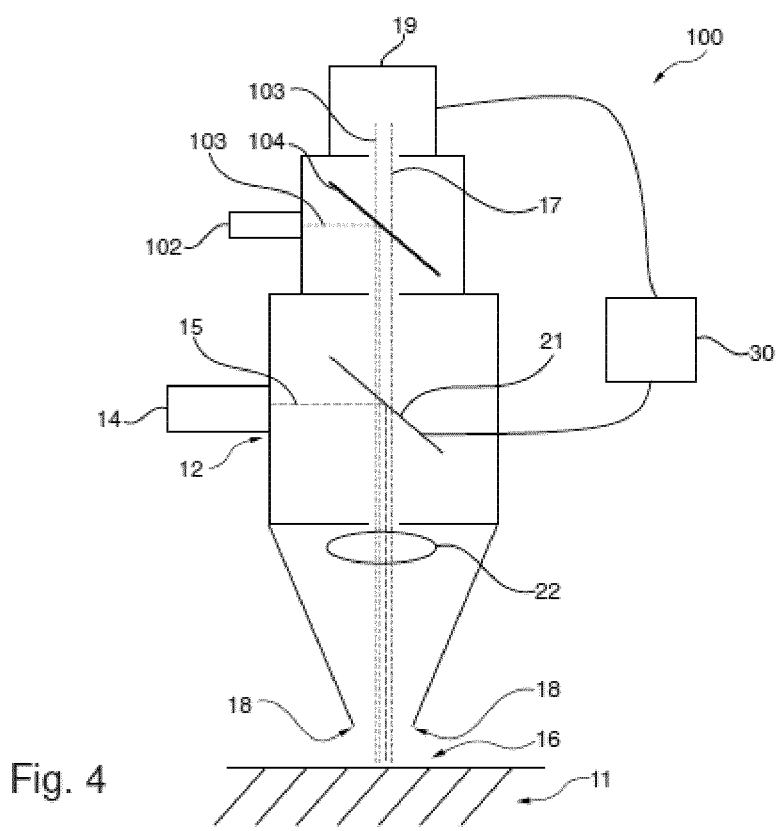
FIG. 4 schematically shows an exemplary laser cutting head 100 of an exemplary embodiment with illumination unit.

FIG. 4 schematically shows a laser cutting head 100 of an exemplary embodiment, which additionally has an illumination unit compared to the laser cutting head 10. In this example, the deflecting mirror 21 is pivotable and the monitoring unit 30 is connected to the drive of the mounting of the deflecting mirror 21 in a data-transmitting manner in order to be able to adjust the propagation direction of the machining laser beam 15 through the exit opening 16 and/or a desired offset of the same with respect to one another in the direction of the workpiece 11.

The illumination unit has an illumination light source 102 for emitting an illumination light beam 103. A narrow-band and spatially-directed light source is used as an illumination light source 102, in this example a diode laser. In the present example, the illumination light source 102 is operated at a power of approximately 1000 mW and generates the illumination light beam 103 at a central wavelength of approximately 638 nm, with a wavelength band of 6 nm. Alternatively, illumination light sources that produce an illumination light beam in a wavelength range of 400 to 1000 nm can be used. The power of the illumination light source can be adjustable. Depending on the power of the machining laser source 14 and/or the nature of the workpiece 11, different illumination powers may be advantageous. For example, the illumination light source can be adjustable between approx. 100 and 2000 mW.

In addition, in the present example in which the illumination light source 102 is arranged laterally on the laser cutting head, a dichroic deflecting mirror 104 is provided for at least partially deflecting the illumination light beam 103 in the direction of the exit opening 16 coaxially with the machining laser beam 15. So that the illumination light beam 103 reflected by the workpiece 11 into the machining head 100 is also detected, the detector unit is (also) at least partially sensitive to it, and the deflecting mirror 104, the deflecting mirror 21 and the focusing lens 21 are (also) at least partially transparent to it.

Figure 5A:
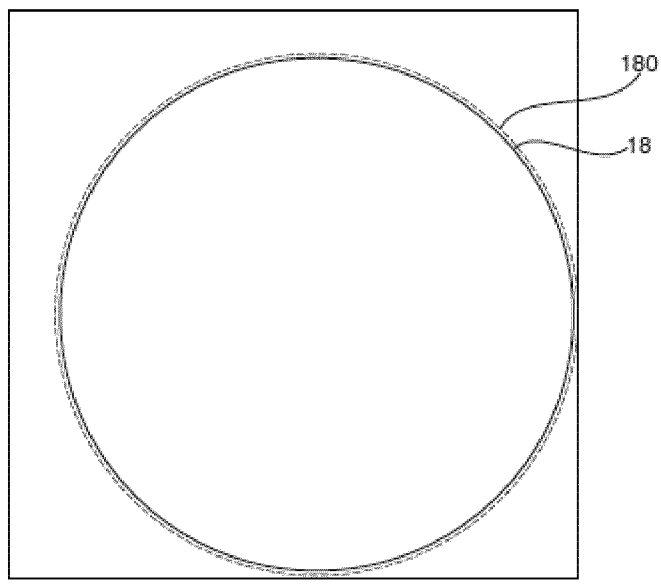
FIG. 5a schematically shows an image of a workpiece through the exit opening of the laser cutting head 100 with illumination.
Figure 5B:
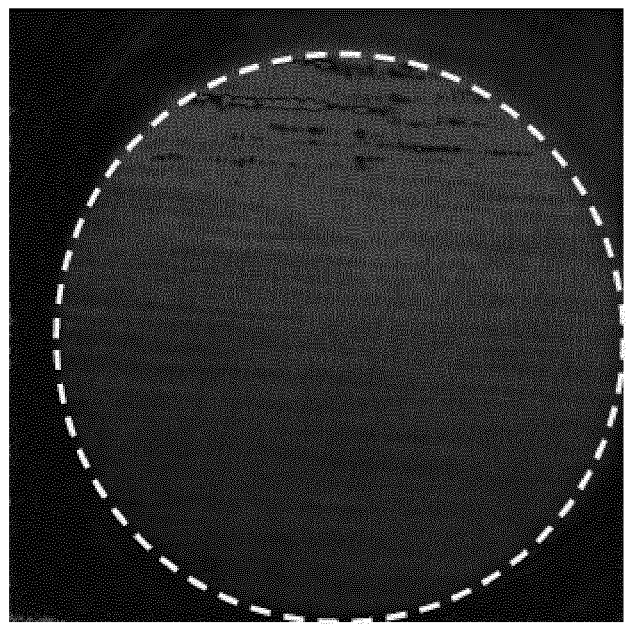

FIG. 5a schematically shows an image of the workpiece 11 through the exit opening 16 of the laser cutting head 100, in which the workpiece 11 is merely illuminated and not machined. This means that, in this image, the machining laser source 14 is turned off and the illumination light source 102 is turned on. FIG. 5b shows the corresponding image recorded by a camera. The illumination light source 102 here illuminates both the opening edge 18 and the workpiece 11. Therefore, this image shows the opening edge 18 of the exit opening 16. In the image, the corresponding pixels determined by the first determination module, i.e., the positions of the opening edge 18 in the image, are marked with a dashed line 180. The first determination module determines therefrom the position of the spatial centre of the exit opening 16 in the image, as explained above with respect to laser cutting head 10. This image can also be used to calibrate the imaging ratio as described above, if it is known how large the nozzle opening actually is.

During cutting operation, the process zone of the workpiece 11 is not only machined by the laser cutting head 100 with the machining laser beam 15, but also illuminated by the illumination light beam 103 through the exit opening 16. The latter can be continuous, discontinuous, intermittent and/or stroboscopic in nature.

Figure 6A:
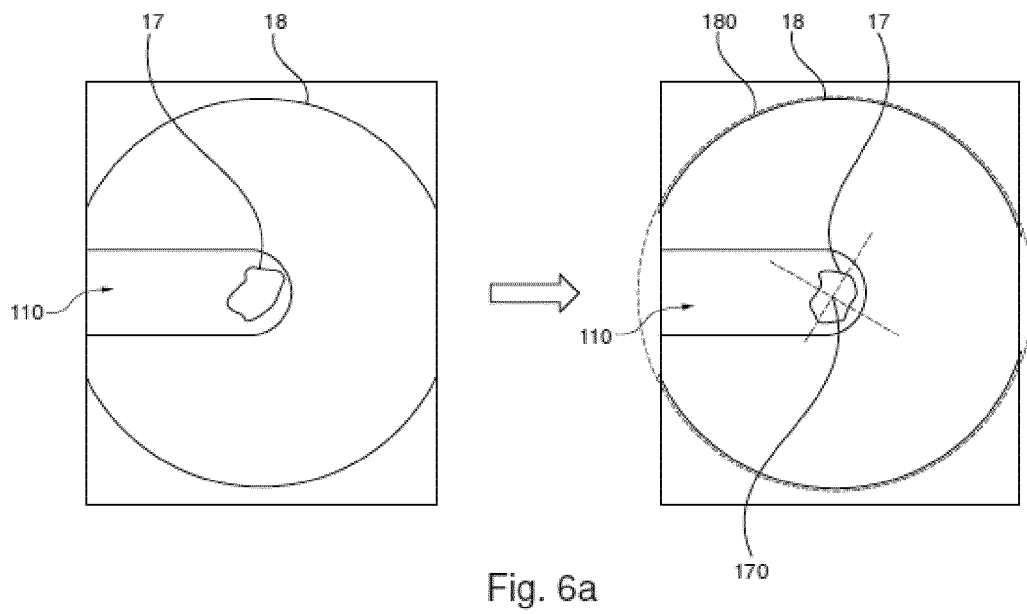
FIG. 6a schematically shows an image of a process zone of a workpiece through the exit opening of the laser cutting head 100 (left) and with determined position of the exit opening and determined position of the emitted electromagnetic radiation through the exit opening into the laser cutting head (right), in each case with illumination.
Figure 6B:
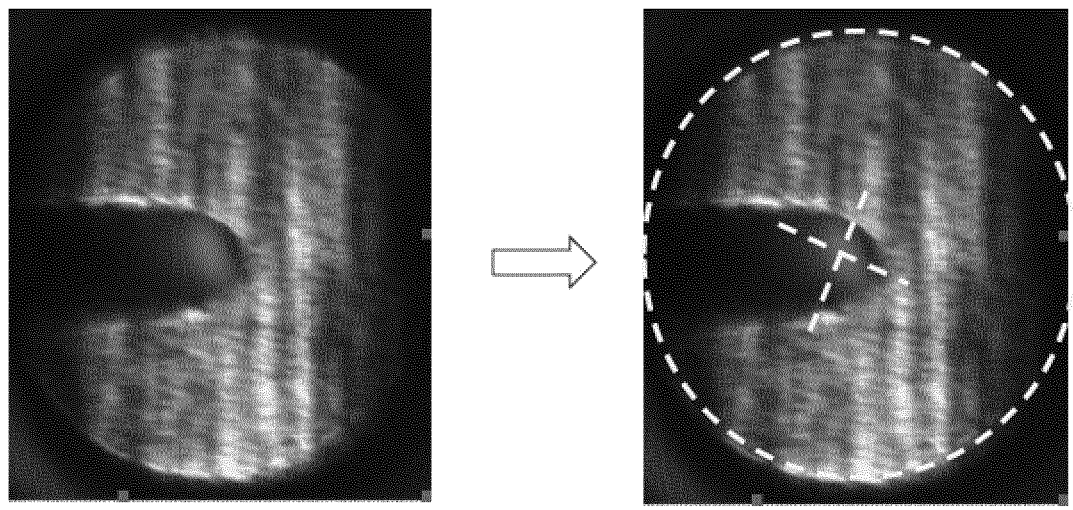

FIG. 6a schematically shows on the left an image of a machined and illuminated process zone of a workpiece through the exit opening of the laser cutting head 100. For this purpose, the illumination and/or camera exposure of the detector unit 19 was selected so that both the process light 17 and the edge of the exit opening 16 are visible. The image shows the process light 17, the opening edge 18, and the kerf 110. FIG. 6a schematically shows the same image on the right with determined position 180 of the inner opening edge 18 of exit opening 16 and with determined position 170 of the process light 17 emitted through the exit opening into the laser cutting head. The positions in the image determined by the first and second determination modules or their pixels are marked with dashed lines. FIG. 6b shows the corresponding image recorded by a camera. The first determination module determines therefrom the position of the spatial centre of the exit opening 16 in the image, and the second determination module determines therefrom the position of the centre of the highest energy density of the process light beam 17. For example, the brightest pixel or a group of contiguous pixels with the greatest, in particular averaged, brightness of the recorded digital image can be used. The determined positions of the exit opening 16 and the process light beam 17 are compared by the third determination module, which determines a positional relationship from them.

In alternative examples, the process zone of the workpiece 11 is recorded with two or more images alternating with illumination and without illumination. In one example, the illumination light source 102 is operated in a periodically alternating, particularly stroboscopic, manner, i.e., illumination is provided at specific, regularly spaced time intervals. For this purpose, during the machining of the workpiece 11, its process zone is illuminated in first time intervals which are separated from each other by second time intervals in which the process zone is not illuminated. The detector unit 19 is configured to detect the process light 17 and the reflected illumination light 103 and to provide alternating images of the illuminated and non-illuminated process zones. The latter can take the form of a video stream, for example. The video stream is provided as a plurality of video frames reproducing images/recordings of the process zone, at an image frequency, also referred to as frame rate. The first and second time intervals are synchronized with the frame rate.

Figure 7A:
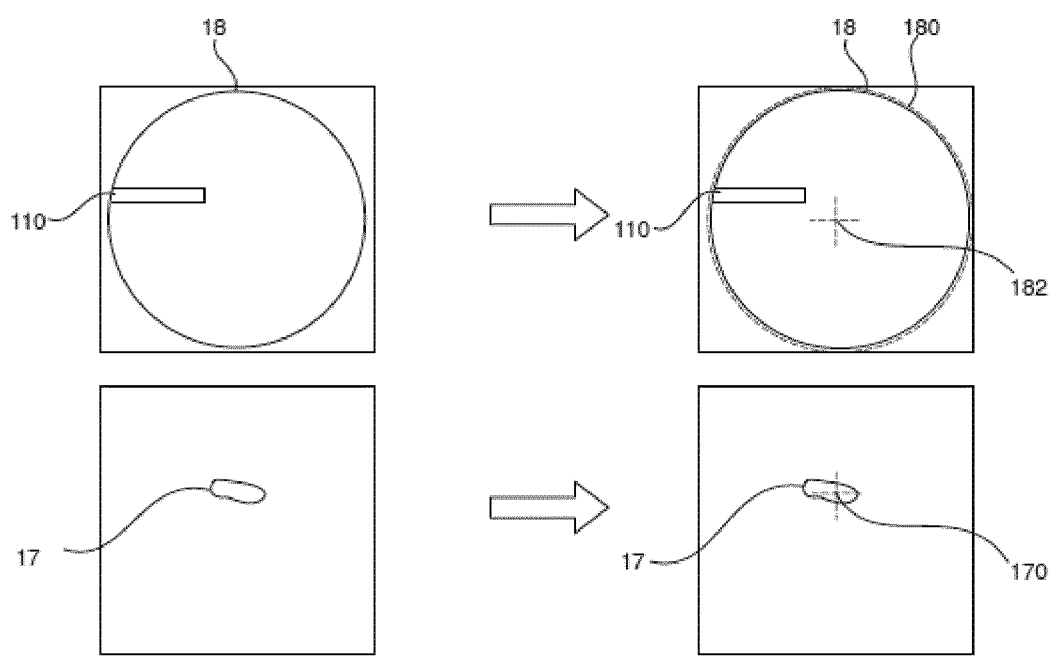
FIG. 7a schematically shows images of a process zone of a workpiece through the exit opening of the laser cutting head 10 (left) and with determined position of the exit opening and determined position of the emitted electromagnetic radiation through the exit opening into the laser cutting head (right); upper line: with illumination, lower line: without illumination.
Figure 7B:
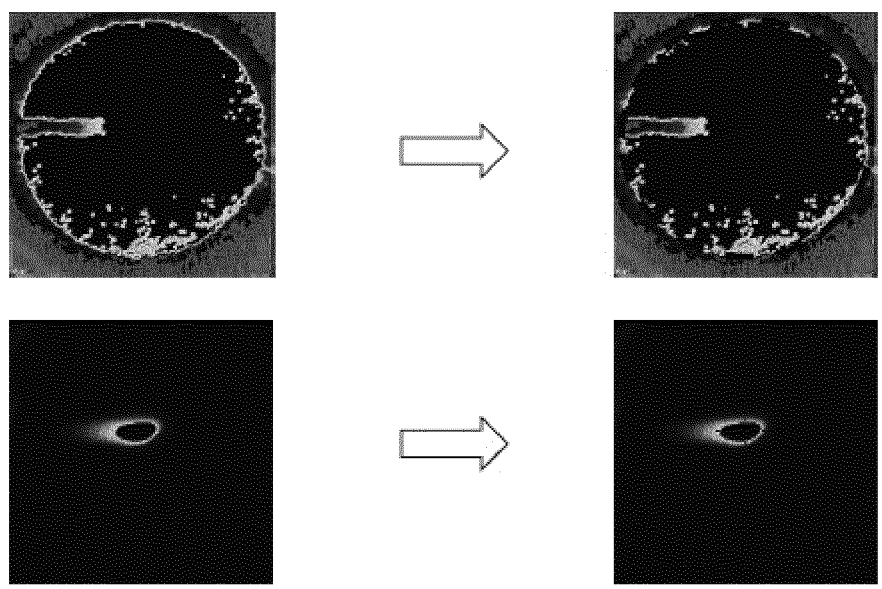

FIG. 7a schematically shows two images of the process zone of the workpiece 11 taken alternatingly with illumination (upper line of FIG. 7a) and without illumination (lower line of FIG. 7a). FIG. 7a schematically shows on the left the two images of the process zone through the exit opening 16 of the laser cutting head 100. This shows the opening edge 18, the kerf 110 and the process light 17. FIG. 7a schematically shows on the right the same images with determined position 180 of the opening edge 18, determined position 182 of the spatial centre of the exit opening 16 and determined position 170 of the process light 17. FIG. 7b shows the images recorded by a camera corresponding to FIG. 7a. The first determination module determines the position 182 of the spatial centre of the exit opening 16 in the image, and the second determination module determines the position 170 of the spatial centre of the process light beam 17, as explained above for FIGS. 6a, 6b. The determined position 182 of the centre of the exit opening 16 and the determined position 170 of the process light beam 17 are compared by the third determination module, which determines a positional relationship therefrom.

In the above exemplary embodiments of the laser cutting head, the optical detector unit 19 is coaxial with the exit opening 16 and coaxial with respect to the propagation direction of the machining laser beam 15 through the exit opening 16. As a result, the detector unit 19 records at least one image of at least part of the process light 17 emitted coaxially by the workpiece 11 through the exit opening 16 into the beam machining head, in particular coaxially with respect to the propagation direction of the machining energy beam 15 through the exit opening. In this way, the process zone of the workpiece 11 and the opening edge 18 of the exit opening 16 are recorded with the same perspective. In alternative examples, the optical detector unit 19 is not provided coaxially with the exit opening but, for example, on the side of the laser cutting head. In such examples, deflecting devices, such as deflecting mirrors, may be provided in the cutting head for directing the process light 17 and the reflected illumination light 103 to the detector unit 19. This allows the process zone of the workpiece 11 and the opening edge 18 of the exit opening 16 to be recorded with the same perspective. In other examples, when the optical detector unit 19 and the exit opening 16 are arranged in a non-coaxial manner, no deflector is provided to the detector device. Then the process zone of the workpiece 11 and the opening edge 18 of the exit opening 16 are recorded with different perspectives. In these cases, the third determination module and/or the control module are configured to correct at least one perspective of the at least one image and/or different perspectives of the at least one position of the exit opening 16 and the at least one position of the centre of the process light 17 and perform such corrections in operation.

Figure 8:
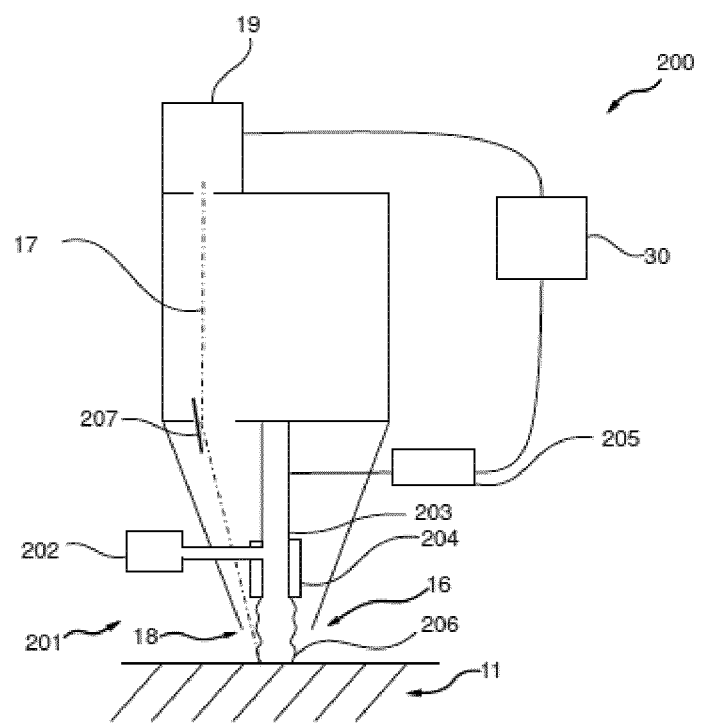
FIG. 8 schematically shows a plasma cutting head 200 of an exemplary embodiment.

FIG. 8 schematically shows a plasma cutting head 200 of an exemplary embodiment. The plasma cutting head 200 contains a plasma generation device 201 having a gas reservoir 202 and a nozzle-shaped ring electrode 204 disposed in the cutting head at exit opening 16. The ring electrode 204 is provided on an electrode holder 203, which is adjustable by means of an electrode adjustment unit 205 provided with a drive. The electrode adjustment unit 205 is in turn connected in a data-transmitting manner to the monitoring unit 30, which in turn is connected in a data-transmitting manner to the detector unit 19. The position of the ring electrode 204 can be adjusted relative to the exit opening by means of the electrode holder 203 and the electrode adjustment unit 205. The gas reservoir 202 contains a gas, such as argon, nitrogen, oxygen, and/or hydrogen, and is connected in a gas-conducting manner to the interior of the ring electrode 204. The plasma generation device 201 also includes a power supply and an electrical connection (each not shown) for applying a voltage and an electric field, respectively, between the ring electrode 204, and the metallic workpiece 11 serving as a counter electrode. In this example, the optical axis of the detector unit 19 and the video camera contained therein is not coaxial with the plasma beam 206, but is oblique. For this purpose, part of the process light 17, which is emitted obliquely to the plasma beam 206 laterally from the process zone, is guided to the detector unit 19 by deflecting at a deflecting mirror 207.

In an alternative example, instead of the ring electrode 204, a rod-shaped inner electrode surrounded by a gas nozzle can be provided in the cutting head at the exit opening 16, the position of which can be adjusted.

In operation of the plasma cutting head 200, a plasma beam 206 of positive and negative ions and electrons is generated by means of the plasma generation device 201 and directed to the workpiece 11 by igniting the gas directed into the ring electrode 204. In this, the plasma is induced in the gas by the plasma generation device 201 with a high-voltage pulse. An arc is created within the plasma beam 206. The plasma beam 206 is guided over the surface of the workpiece 11 in order to cut it. In this process, the process light 17 as the emitted electromagnetic radiation from the workpiece 11 results from the interaction of the plasma beam 206 with the workpiece 11. The positional relationship of the process light 17 and the exit opening 16 to each other is determined and monitored in the same way as explained above for the laser cutting head, and adjusted if necessary. For determining the positional relationship, due to the optical axis of the detector unit 19 being oblique to the plasma beam 206, the monitoring unit 30 can be used to correct the perspective of the at least one image recorded by the detector unit 19. For example, different perspectives of the at least one position 180, 182 of the exit opening 16 and the at least one position 170 of the centre of the emitted electromagnetic radiation 17 in the image(s) may be corrected by means of the third determination module and/or the control module.

The invention claimed is:

1. A beam machining head for beam cutting of a workpiece, the beam machining head comprising:
   an interface for an energy beam source for generating a focused machining energy beam selected from a particle beam source, a fuel fluid beam source, a plasma beam source and/or a source for electromagnetic radiation;
   an exit opening for the machining energy beam bounded by an opening edge;
   an optical detector unit for recording at least one image of an electromagnetic radiation emitted from the workpiece through the exit opening into the beam machining head, which is induced in the workpiece by the machining energy beam and is a process light; and
   a monitoring unit connected to the optical detector unit in a data-transmitting manner for monitoring a positional relationship between a centre of the emitted electromagnetic radiation and the exit opening;
   wherein said monitoring unit includes:
     a first determination module for determining at least one position of the exit opening in the at least one image;
     a second determination module for determining at least one position of the centre of the emitted electromagnetic radiation in the at least one image; and
     a third determination module for determining the positional relationship between the at least one position of the centre of the emitted electromagnetic radiation and the at least one position of the exit opening;
   wherein the second determination module is configured to determine the position of a centre of highest energy density of the emitted radiation as the position of the centre of the emitted electromagnetic radiation.

2. The beam machining head according to claim 1, wherein the monitoring unit has a control module for outputting at least one element selected from a signal indicating the determined positional relationship to a display unit;
   a signal indicating a determined positional relationship deviating from a predetermined positional relationship; and
   a control command, to a control unit, selected from a command to continue machining and a command to stop machining; and
   at least one positioning command, to a positioning unit, for setting the positional relationship between the at least one position of the centre of the emitted electromagnetic radiation and the at least one position of the exit opening to a predetermined positional relationship.

3. The beam machining head according to claim 1,
wherein the first determination module is configured to determine the at least one position of the exit opening in at least two directions; and/or
wherein the first determination module is configured to determine at least one element selected from the at least one position of the opening edge bounding the exit opening and the position of a centre of the exit opening.

4. The beam machining head according to claim 1,
wherein the second determination module is configured to determine the at least one position of the centre of the emitted electromagnetic radiation in at least two directions; and/or
wherein the second determination module is configured to determine the position of a spatial centre of the emitted radiation as the position of the centre of the emitted electromagnetic radiation.

5. The beam machining head according to claim 1, having
an energy beam source provided at the interface for generating a focused machining energy beam; and/or
a positioning unit, connected to the monitoring unit in a data-transmitting manner, for continuously or discontinuously adjusting the positional relationship between the at least one position of the centre of the emitted electromagnetic radiation and the at least one position of the exit opening, to a predetermined positional relationship; and/or
an illumination unit for continuous, discontinuous, intermittent and/or stroboscopic illumination of the workpiece through the exit opening or an interface for such an illumination unit.

6. The beam machining head according to claim 1,
wherein the exit opening and the optical detector unit are arranged coaxially with respect to a propagation direction of the machining energy beam through the exit opening; and/or,
wherein the optical detector unit is configured to record at least one image of at least a part of an emitted electromagnetic radiation from the workpiece coaxially through the exit opening into the beam machining head with respect to the propagation direction of the machining energy beam through the exit opening; and/or
wherein the exit opening is configured to be circular and/or with a diameter of 0.025 to 10 mm, preferably 0.6 to 8 mm, more preferably 0.8 to 6 mm; and/or
wherein the third determination module and/or the control module is configured for correcting at least one perspective of the at least one image and/or different perspectives of the at least one position of the exit opening and the at least one position of the centre of the emitted electromagnetic radiation.

7. A beam machining device for beam cutting of a workpiece, for laser machining or plasma beam machining, having a beam machining head according to claim 1.

8. A method for beam cutting a workpiece, the beam cutting including laser beam machining or plasma beam machining, with a beam machining head comprising:
an interface for an energy beam source for generating a focused machining energy beam selected from a particle beam source, a fuel fluid beam source, a plasma beam source and/or a source for electromagnetic radiation;
an exit opening for the machining energy beam bounded by an opening edge;
an optical detector unit for recording at least one image of an electromagnetic radiation emitted from the workpiece through the exit opening into the beam machining head, which is induced in the workpiece by the machining energy beam and is a process light; and
a monitoring unit connected to the optical detector unit in a data-transmitting manner for monitoring a positional relationship between a centre of the emitted electromagnetic radiation and the exit opening;
wherein said monitoring unit includes:
a first determination module for determining at least one position of the exit opening in the at least one image;
a second determination module for determining at least one position of the centre of the emitted electromagnetic radiation in the at least one image; and
a third determination module for determining the positional relationship between the at least one position of the centre of the emitted electromagnetic radiation and the at least one position of the exit opening;
wherein the second determination module is configured to determine the position of a centre of highest energy density of the emitted radiation as the position of the centre of the emitted electromagnetic radiation, the method comprising:
generating a machining energy beam with an energy beam source provided at the interface of the beam machining head for generating a focused machining energy beam selected from a particle beam source, a fuel fluid beam source, a plasma beam source and/or a source for electromagnetic radiation;
irradiating a workpiece with the machining energy beam through the exit opening;
machining the workpiece with the machining energy beam, inducing electromagnetic radiation in the workpiece which is a process light and is emitted at least partially coaxially with the machining energy beam through the exit opening into the beam machining head;
recording at least one image of at least part of the emitted electromagnetic radiation induced in the workpiece by the machining energy beam through the exit opening into the beam machining head with the optical detector unit of the beam machining head; and
monitoring a positional relationship between a centre of the emitted electromagnetic radiation and the exit opening with the monitoring unit of the beam machining head, wherein
the first determination module of the monitoring unit determines at least one position of the exit opening in the at least one image,
the second determination module of the monitoring unit determines at least one position of the centre of the emitted electromagnetic radiation in the at least one image, and
the third determination module of the monitoring unit determines the positional relationship between the at least one position of the centre of the emitted electromagnetic radiation and the at least one position of the exit opening;
characterized in that the second determination module determines the position of a centre of highest energy density of the emitted radiation as the position of the centre of the emitted electromagnetic radiation.

9. The method according to claim 8,
wherein the control module of the monitoring unit outputs at least one element selected from
a signal indicating the determined positional relationship to a display unit,
a signal indicating a determined positional relationship deviating from a predetermined positional relationship;

a control command, to a control unit, selected from a command to continue machining and a command to stop machining; and
at least one positioning command, to the positioning unit, for setting the positional relationship between the at least one position of the centre of the emitted electromagnetic radiation and the at least one position of the exit opening to a predetermined positional relationship.

10. The method according to claim 8,
wherein the first determination module determines the at least one position of the exit opening in at least two directions; and/or
wherein the first determination module determines at least one element selected from the at least one position of the opening edge defining the exit opening and the position of a centre of the exit opening.

11. The method according to claim 8,
wherein the second determination module determines the at least one position of the centre of the emitted electromagnetic radiation in at least two directions; and/or
wherein the second determination module determines the position of a spatial centre of the emitted radiation as the position of the centre of the emitted electromagnetic radiation.

12. The method according to claim 8, further comprising:
continuously or discontinuously adjusting the positional relationship between the at least one position of the centre of the emitted electromagnetic radiation and the at least one position of the exit opening, to a predetermined positional relationship, by means of the positioning unit; and/or
calibrating the image scale of the at least one image; and/or
correcting at least one perspective of the at least one image and/or different perspectives of the at least one position of the exit opening and the at least one position of the centre of the emitted electromagnetic radiation, by means of the third determination module and/or the control module.

13. The method according to claim 8,
wherein the optical detector unit records at least one image of at least part of an electromagnetic radiation emitted from the workpiece coaxially through the exit opening into the beam machining head with respect to the propagation direction of the machining energy beam through the exit opening; and/or
wherein the workpiece is continuously, discontinuously and/or stroboscopically illuminated through the exit opening coaxially or non-coaxially to the machining energy beam, with the illumination unit; and/or
wherein two or more images are recorded in an alternating manner or in a periodically alternating manner, with illumination and without illumination.

14. A computer program product comprising one or more program modules to perform a method of beam cutting a workpiece with a beam machining head comprising:
an interface for an energy beam source for generating a focused machining energy beam selected from a particle beam source, a fuel fluid beam source, a plasma beam source and/or a source for electromagnetic radiation;
an exit opening for the machining energy beam bounded by an opening edge;
an optical detector unit for recording at least one image of an electromagnetic radiation emitted from the workpiece through the exit opening into the beam machining head, which is induced in the workpiece by the machining energy beam and is a process light; and
a monitoring unit connected to the optical detector unit, in a data-transmitting manner for monitoring a positional relationship between a centre of the emitted electromagnetic radiation and the exit opening;
wherein said monitoring unit includes:
a first determination module for determining at least one position of the exit opening in the at least one image;
a second determination module for determining at least one position of the centre of the emitted electromagnetic radiation in the at least one image; and
a third determination module for determining the positional relationship between the at least one position of the centre of the emitted electromagnetic radiation and the at least one position of the exit opening;
wherein the second determination module is configured to determine the position of a centre of highest energy density of the emitted radiation as the position of the centre of the emitted electromagnetic radiation,
wherein the program modules are loaded into a memory of the monitoring unit, the method comprising:
generating a machining energy beam with an energy beam source provided at the interface of the beam machining head for generating a focused machining energy beam selected from a particle beam source, a fuel fluid beam source, a plasma beam source and/or a source for electromagnetic radiation;
irradiating a workpiece with the machining energy beam through the exit opening;
machining the workpiece with the machining energy beam, inducing electromagnetic radiation in the workpiece which is a process light and is emitted at least partially coaxially with the machining energy beam through the exit opening into the beam machining head;
recording; at least one image of at least art of the emitted electromagnetic radiation induced in the workpiece by the machining energy beam through the exit opening into the beam machining head with the optical detector unit of the beam machining head; and
monitoring a positional relationship between a centre of the emitted electromagnetic radiation and the exit opening with the monitoring unit of the beam machining head, wherein
the first determination module of the monitoring unit determines at least one position of the exit opening in the at least one image,
the second determination module of the monitoring unit determines at least one position of the centre of the emitted electromagnetic radiation in the at least one image, and
the third determination module of the monitoring unit determines the positional relationship between the at least one position of the centre of the emitted electromagnetic radiation and the at least one position of the exit opening;
characterized in that the second determination module determines the position of a centre of highest energy density of the emitted radiation as the position of the centre of the emitted electromagnetic radiation.

15. A non-transitory computer readable medium on which are stored one or more program modules, which are readable and executable to perform the method of beam cutting a workpiece with a beam machining head when the program modules are loaded into a memory of the monitoring unit, wherein the beam machining head comprises:

an interface for an energy beam source for generating a focused machining energy beam selected from a particle beam source, a fuel fluid beam source, a plasma beam source and/or a source for electromagnetic radiation;

an exit opening for the machining energy beam bounded by an opening edge;

an optical detector unit for recording at least one image of an electromagnetic radiation emitted from the work piece through the exit opening into the beam machining head, which is induced in the workpiece by the machining energy beam and is a process light; and a monitoring unit connected to the optical detector unit in a data-transmitting manner for monitoring a positional relationship between a centre of the emitted electromagnetic radiation and the exit opening;

wherein said monitoring unit includes:
a first determination module for determining at least one position of the exit opening in the at least one image;
a second determination module for determining at least one position of the centre of the emitted electromagnetic radiation in the at least one image; and
a third determination module for determining the positional relationship between the at least one position of the centre of the emitted electromagnetic radiation and the at least one position of the exit opening;

wherein the second determination module is configured to determine the position of a centre of highest energy density of the emitted radiation as the position of the centre of the emitted electromagnetic radiation, the method comprises:
generating a machining energy beam with an energy beam source provided at the interface of the beam machining head for generating a focused machining energy beam selected from a particle beam source, a fuel fluid beam source, a plasma beam source and/or a source for electromagnetic radiation;

irradiating a workpiece with the machining energy beam through the exit opening;

machining the workpiece with the machining energy beam, inducing electromagnetic radiation in the workpiece which is a process light and is emitted at least partially coaxially with the machining energy beam through the exit opening into the beam machining head;

recording at least one image of at least part of the emitted electromagnetic radiation induced in the workpiece by the machining energy beam through the exit opening into the beam machining head with the optical detector unit of the beam machining head; and monitoring a positional relationship between a centre of the emitted electromagnetic radiation and the exit opening with the monitoring unit of the beam machining head, wherein the first determination module of the monitoring unit determines at least one position of the exit opening in the at least one image, the second determination module of the monitoring unit determines at least one position of the centre of the emitted electromagnetic radiation in the at least one image, and the third determination module of the monitoring unit determines the positional relationship between the at least one position of the centre of the emitted electromagnetic radiation and the at least one position of the exit opening;

characterized in that the second determination module determines the position of a centre of highest energy density of the emitted radiation as the position of the centre of the emitted electromagnetic radiation.

* * * * *